United States Patent Office 2,816,103
Patented Dec. 10, 1957

2,816,103

FUNCTIONAL DERIVATIVES OF AZO-DYE-
STUFFS CONTAINING SULFONIC ACID
GROUPS AND PROCESS FOR MAKING
THEM

Max Schmid, Riehen, Rudolf Mory, Dornach, and
Christian Zickendraht, Binningen, Switzerland, assignors to Ciba Limited, Basel, Switzerland No Drawing. Application February 26, 1954,
Serial No. 412,954

Claims priority, application Switzerland
February 27, 1953

14 Claims. (Cl. 260—162)

Azo-dyestuffs containing sulfonic acid groups are known and available in large numbers. However, dyestuffs containing functionally converted sulfonic acid groups, especially sulfonic acid amide groups, have recently become increasingly important, and especially complex metal compounds of ortho:ortho'-dihydroxy-monoazo-dyestuffs of this kind. Like the dyestuffs containing sulfonic acid groups those containing sulfonic acid amide groups are prepared from diazo-components and coupling components which already contain the said groups. It will be understood that components containing sulfonic acid groups are accessible more easily or in greater numbers than those containing sulfonic acid amide groups. Similar considerations obviously also apply in the field of dyestuffs.

The present invention enables the sulfonic acid groups in ortho:ortho'-dihydroxy-azo-dyestuffs containing such groups to be converted into sulfonic acid amid or sulfonic acid ester groups, and thus extends the range of available dyestuffs of this kind. Moreover, the process of this invention is also advantageous for the manufacture of some of the dyestuffs of this kind available hitherto.

By the process of this invention functional derivatives of dyestuffs containing sulfonic acid groups are made by reacting an acyl derivative of an ortho:ortho'-dihydroxy-azo-dyestuff containing sulfonic acid groups in an inert solvent or diluent with a compound of pentavalent phosphorus containing at least three carbon atoms, and, if desired, converting an acid halide group in the resulting acid halide into a sulfonic acid amide group or a sulfonic acid ester group.

The acyl derivatives serving as starting materials are advantageously prepared by acylating ortho:ortho'-dihydroxy-azo-dyestuffs containing sulfonic acid groups. These dyestuffs may contain one, two or more sulfonic acid groups. Especially suitable are, for example, monoazo-dyestuffs which contain two sulfonic acid groups or advantageously a single sulfonic acid group. The dyestuffs may be otherwise substituted in any desired manner. However, it is generally desirable to use dyestuffs which contain, in addition to the hydroxyl groups in ortho-position to the azo linkage, no substituents capable of reacting with phosphorus halides of the kind mentioned above, for example, further hydroxyl groups or primary amino groups, unless reaction with such substituents is desired or is at least not disadvantageous. As a substituent of this kind there may be mentioned above all the carboxylic acid group, which is converted into a carboxylic acid halide group when reacted with a phosphorus pentahalide.

The azo linkage may be bound, for example, on each side to an aryl carbon atom or on one side to an aryl carbon atom and on the other to an enolizable or enolized keto-methylene group. There may be used, for example, ortho:ortho'-dihydroxy-monoazo-dyestuffs of which the azo linkage is bound on one side to a benzene nucleus and on the other to a naphthalene nucleus or to a 1-phenyl-3-methyl-5-pyrazolone radical. As is known dyestuffs of this kind can be made especially easily and in large numbers by coupling an ortho-hydroxy-diazo-compound of the benzene series with a hydroxynaphthalene capable of coupling in ortho-position to the hydroxyl group or with a 1-phenyl-3-methyl-5-pyrazolone, at least one of the starting materials containing at least one sulfonic acid group. The coupling components, and especially the diazo components, may contain further substituents in addition to those mentioned above. Thus, there come into consideration for example, as diazo components ortho-hydroxy-aminobenzenes which contain the following substituents: Nitro groups, alkyl groups such as ethyl or methyl, alkoxy groups such as ethoxy or methoxy, halogen atoms such as fluorine, bromine or especially chlorine, trifluoromethyl groups, carboxylic acid groups, aryl sulfone groups or aryloxy groups.

Apart from these monazo-dyestuffs there may be used as starting materials other monoazo-dyestuffs corresponding to the definition given above, for example, those in which the azo linkage is bound on both sides to a naphthalene nucleus, or on one side to a naphthalene nucleus and on the other to a pyrazolone nucleus, and which can be obtained, for example, by coupling a diazotized ortho-hydroxy-aminonaphthalene sulfonic acid, such as 1-amino-2-hydroxynaphthalene-4-sulfonic acid or 2-amino-1-hydroxynaphthalene-4-sulfonic acid, with a hydroxynaphthalene or a hydroxynaphthalene sulfonic acid or a 1-phenyl-3-methyl-5-pyrazolone.

Finally, there may also be mentioned dyestuffs which are obtained by coupling an ortho-hydroxy-diazo compound with a hydroxybenzene capable of coupling in ortho-position to the hydroxyl group, an acetoacetylamino-compound, a hydroxy-quinoline or a barbituric acid.

Ortho:ortho'-dihydroxy-azo-dyestuffs can be converted in the form of their free acids or as alkali salts into the acyl derivatives serving as starting materials in the process of the invention. If the dyestuffs contain more than one sulfonic acid group the latter may be present only partially in the form of alkali sulfonate groups. Depending on its constitution it is sometimes especially advantageous to use the dyestuff in one or other of these forms for the acylation and the subsequent reaction with the phosphorus compounds.

As the acyl groups usually serve only to protect the hydroxyl groups in ortho-position to the azo linkage during the treatment with the phosphorus compounds and they are subsequently split off, it is generally desirable to carry out the acylation with an easily accessible acylating agent or one of simple constitution. Especially advantageous in many cases are acylating agents which introduce acyl radicals derived from carboxylic acids of low molecular weight, especially aliphatic carboxylic acids, such, for example, as the propionyl and especially the acetyl radical. There may be used the anhydrides or halides of such acids, for example butyric acid chloride, propionic acid chloride, acetyl chloride or acetic anhydride.

In certain cases, especially for acylating mono-azo-dyestuffs in which the azo linkage is bound on each side to a naphthalene nucleus, it is desirable to use derivatives of aromatic carboxylic acids, especially benzoyl chloride, as the dibenzoylated compounds are more suitable for the subsequent reaction with the phosphorus halide than are, for example, the acetyl compounds.

It is in general of advantage to use the dyestuff in the dry state for the acylation and to carry out the reaction in an inert solvent or diluent. When the dyestuffs still contain water, the latter can in some cases be removed by azeotropic distillation. This method of acylation is advantageous not only because the reaction proceeds well, but is usually appropriate because the subsequent treatment is also carried out in an inert diluent and therefore in the absence of water. There is advantageously used an organic diluent; as organic diluents there come into consideration, for example, hydrocarbons such as benzene, toluene, xylenes, substituted benzenes such as nitrobenzene, monochlorobenzene, the di- and tri-chlorobenzenes liquid at room temperature, and also compounds of other kinds such as dioxane or tertiary bases such as pyridine, or mixtures of diluents of these kinds. The acylation is advantageously carried out at a raised temperature, for example, at between about 70 and 100° C.

The acyl compounds so obtained may, if desired, be separated from the reaction mixture. However, such an intermediate separation can usually be dispensed with and after the acylation the treatment with the phosphorus compound may be carried out in the same reaction mixture.

As compounds of pentavalent phosphorus containing at least three halogen atoms there may used, in the present process, for example, phosphorus oxybromide or phosphorus oxychloride, but more especially a phosphorus pentahalide such as phosphorus pentabromide or advantageously phosphorus pentachloride. A phosphorus pentahalide may be used in conjunction with a phosphorus oxyhalide, in which case the latter does not serve primarily as a hydrogenating agent but as an inorganic diluent. When the reaction is carried out with a phosphorus oxyhalide an excess of the latter halogenating agent may serve as diluent.

Depending on the choice of the diluent and the constitution of the dyestuff the most favorable reaction temperature may vary so that in some cases, at least at the beginning of the reaction it may be desirable to cool the mixture, whereas in other cases gentle warming may be preferable after the reaction has started at room temperature. If the reaction conditions are too energetic there is a risk of side reactions taking place.

The sulfonic acid halides obtainable by the present process can be recovered from the reaction mixture by methods in themselves known, for example, by pouring the mixture on to ice, which is recommended in the case of diluents such as dioxane which are miscible with water, and then filtering the mixture, washing the residue free from acid and drying it cautiously, for example, in vacuo at a moderately raised temperature. When the reaction mixture contains a diluent insoluble or sparingly soluble in water, it is usually of advantage, after the reaction and, if desired, after allowing the mixture to cool, to filter off the resulting sulfonic acid halide, provided that the acid halide is sparingly soluble in the cold in the diluent used. When it is easily soluble and does not separate out sufficiently in the cold, it can usually be precipitated from the solution by dilution with another solvent, for example, petroleum ether. The acid halides so obtained can generally be recrystallized well from organic solvents such as benzene, chlorobenzene, nitrobenzene, ligroin, glacial acetic acid, acetone, trichlorethylene and the like, and can generally be obtained analytically pure in this manner.

In certain cases the acyl groups are so loosely bound to the hydroxyl groups that they split off even during the usual methods of working up the sulfonic acid halides.

The new acid halides are ortho:ortho'-dihydroxy-azo-dyestuffs which contain at least one sulfonic acid halide group, or acyl derivatives of these dyestuffs. They are valuable intermediate products which can be further treated, for example, in the manner hereinbefore mentioned. In general these products can be reacted by methods in themselves known with any compounds which are capable of reacting with sulfonic acid halides. Valuable products are obtained by condensing the acid chlorides, as already stated, with compounds which contain at least one —NH— group, or at least one hydroxyl group.

In addition to ammonia, there come into consideration for this condensation a very wide variety of amines, especially primary monamines. In order to ensure a unitary course of reaction it is generally of advantage to react sulfonic acid halides, which contain more than one sulfonic acid halide group or one such group and a carboxylic acid halide group, with monamines. For the same reason it is recommended to condense di- or polyamides with monosulfonic acid halides containing no further reactive halogen atoms.

In other respects the choice of the amine may be made in accordance with the purpose for which the product is to be used. If the sulfonic acid amide to be obtained should still possess a certain solubility in water or alkalies, as is desirable, for example, in the case of dyestuffs used for dyeing textiles, it is of advantage to use ammonia or a primary amine of low molecular weight, such as monomethylamine or monoethylamine, monoethanolamine or even an amine which contains a group imparting solubility in water, such as aminoacetic acid (glycocoll), N-methylaminoacetic acid, aminoethane sulfonic acid (taurine) or 1-aminobenzene-4-sulfonic acid. The presence of more than one such sulfonic acid amide group in the dyestuff molecule (see the preceding paragraph) in general also enhances solubility in water.

When the sulfonic acid amides are intended to possess an extremely low solubility in water and are to be used, for example, as pigments, it is of advantage to condense monosulfonic acid halides with amines of not too low a molecular weight, such as aniline or aminonaphthalenes. Secondary amines of this kind, for example, the arylamines mentioned above, but those in which the hydrogen atom bound to nitrogen is replaced by a methyl or ethyl group, are especially advantageous. Specially in this case also it is of advantage to condense monosulfonic acid halides with diamines in the molecular ratio 2:1, for example, cyclic diamines, and also those which contain two secondary amino groups. As examples there may be mentioned diamines of the benzene series, for example, mononuclear benzenes such as 1:4-diaminobenzene or 1:4-diamino-2:5-dialkoxybenzenes, binuclear or polynuclear benzenes such as 4:4'-diaminodiphenyl, 3:3'-dichloro- or 3:3'-dimethyl- or 3:3'-dimethoxy-4:4'-diaminodiphenyl; diamines of the benzene series, in which two similarly or differently substituted benzene nuclei are linked together by a suitable bridge member, for example, by an oxygen atom, by —SO$_2$—, as in the case of 4:4'-diaminodiphenyl sulfone, by —CO— as in the case of 3:3'-diaminodiphenyl ketone, by —CH$_2$— as in the case of 3:3'-diamino-4:4'-dichlorodiphenylmethane, or by —NH—CO—, —NH—CO—HN—, —SO$_2$—NH$_2$—, —CH=CH—, —CH$_2$—CH$_2$—, —NH— or —N=N—; aromatic diamines of a different kind such as 2:6- or 1:5-diaminonaphthalene or 2-(4'-aminophenyl) - 6 - aminobenzthiazole.

The condensation of the sulfonic acid halide with the amine may be carried out in an anhydrous medium and in some cases in an aqueous medium. It generally takes place surprisingly easily even at temperatures within the boiling range of normal organic solvents such as ethanol, benzene, acetone, toluene, monochlorobenzene, dichlorobenzene or nitrobenzene. In order to accelerate the reaction it is often desirable to use an acid-binding agent, such as sodium acetate or pyridine. When the condensation is carried out with ammonia or a monoamine, it is usually advantageous to use an excess of the base as an acid binding agent. When strongly basic amines are used in some cases hydrolysis of the —O—acyl groups takes place in addition to the reaction at the sulfonic acid halide groups.

As already stated, the acid halides may also be condensed with compounds which contain a hydroxyl group especially a phenolic hydroxy group. As examples of such compounds there may be mentioned, in addition to phenol itself, substituted hydroxybenzenes, such as 4-methyl-1-hydroxybenzene, 4-nitro-1-hydroxybenzene, 4- methyl - 2 - nitro-1-hydroxybenzene, hydroxynaphthalenes such as 1- or 2-hydroxynaphthalenes and also hydroxydiphenyl, 3-hydroxydiphenylene oxide or sulfide and N-methyl-3-hydroxycarbazole.

In this case also a monosulfonic acid halide may be condensed with a dihydroxy-compound in the molecular ratio 2:1 or with a compound containing n-hydroxyl groups in the molecular ratio n:1. As examples there may be mentioned dihydroxybenzenes such as 1:3- or 1:4-dihydroxybenzene, and dihydroxynaphthalenes, such as 1:5- or 2:6-dihydroxynaphthalene.

The condensation with the hydroxy-compound is also advantageously carried out in an organic solvent (see above) and with the addition of an acid-binding agent.

The following examples illustrate the invention, the parts and percentages being by weight unless otherwise stated, and the relationship of parts by weight to parts by volume being the same as that of the kilogram to the liter:

Example 1

89.5 parts of the dyestuff acid, obtained by coupling diazotized 4-chloro-2-amino-1-hydroxybenzene-6-sulfonic acid with 5:8-dichloro-1-hydroxynaphthalene, are mixed with 650 parts by volume of chlorobenzene. For the purpose of complete dehydration 150 parts by volume of liquid are distilled from the mixture. After the addition of 142 parts by volume of acetyl chloride, the mixture is maintained at 80–90° C. for a period of 16 hours and is then allowed to cool. There are then added 164 parts of phosphorus pentachloride in the course of ½ hour in small portions, and the mixture is stirred for 5 hours at room temperature. The mixture is then filtered with suction and the filter residue is dried. The diacylated sulfonic acid chloride of the dyestuff is in the form of pale yellow prisms, which melt at 210–212° C. with decomposition, and has the formula

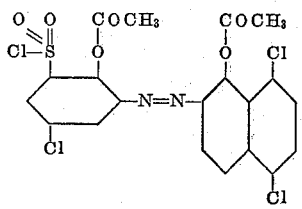

In a manner analogous to that described above the dyestuffs prepared by coupling the diazo-components given in column I of the following table with the coupling components given in column II can be acetylated in the solvents or diluents given in column III, and converted by means of phosphorus pentachloride into the corresponding acetylated dyestuff sulfonic acid chlorides. Columns IV and V give the times and temperatures of the reactions with phosphorus pentachloride. Columns VI give characteristic properties of the resulting sulfonic acid chlorides.

In this table, as in all the other tables, the reaction temperatures are those of the heating baths.

|   | I | II | III | IV | V | VI |
|---|---|---|---|---|---|---|
| 1 | 2-Amino-1-hydroxybenzene-4-sulfonic acid. | 1 - Phenyl - 3 - methyl - 5 - pyrazolone. | Chlorobenzene | ½ hour | 50–60° C | Yellow crystalline powder, melting at 195–196° C. |
| 2 | 2 - Amino - 4 - chloro - 1 - hydroxybenzene. | 1 - Phenyl - 3 - methyl - 5 - pyrazolone - 4' - sulfonic acid. | do | 3½ hours | 20° C | Yellow crystalline powder, melting at 211–212° C. |
| 3 | 6 - Nitro - 1 - amino - 2 - hydroxynaphthalene - 4 - sulfonic acid. | 1 - Phenyl - 3 - methyl - 5 - pyrazolone. | do | 5 hours | 20° C | Yellow-red crysalline powder, melting above 250° C. with decomposition. |
| 4 | 4 - Chloro - 2 - amino - 1 - hydroxybenzene - 6 - sulfonic acid. | 2 - Hydroxynaphthalene. | do | 1½ hours | 20° C | Pale violet unstable product. |
| 5 | 2 - Amino - 1 - hydroxybenzene - 4 - sulfonic acid. | 1 - Acetoacetylamino - 2 - chlorobenzene. | do | 20 hours | 20° C | Pale yellow crystalline powder. |
| 6 | 2 - Amino - 5 - nitro - 1 - hydroxybenzene. | 1 - Acetoacetylamino - 2 - chlorobenzene - 4 - sulfonic acid. | do | 4 hours | 20° C | Yellow crystalline powder. |
| 7 | 4 - Chloro - 2 - amino - 1 - hydroxybenzene - 6 - sulfonic acid. | 1 - Phenyl - 3 - methyl - 5 - pyrazolone. | Benzene | 20 hours | 40–50° C | Orange-yellow powder precipitated by petroleum ether; melting at 204–205° C. with decomposition. |
| 8 | 1 - Amino - 2 - hydroxynaphthalene - 4 - sulfonic acid. | do | Toluene, xylene, chlorobenzene, ortho-dichlorobenzene. | 3 hours | 50–60° C | Brick-red crystalline powder; melting at 206–207° C. with decomposition. |
| 9 | do | 1 - (4'-Chloro) - phenyl - 3 - methyl - 5 - pyrazolone. | Chlorobenzene | 16 hours | 20° C | Brown-orange crystalline powder. |

Product No. 8 corresponds to the formula

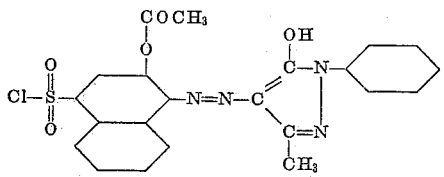

Analysis by combustion shows that the products Nos. 1–3 and 5–9 probably contain one acetyl radical. Product No. 4 after some time becomes a red crystalline compound analysis of which shows that it is an ortho:ortho'-dihydroxy compound free from acyl groups.

Example 2

A mixture of 44.8 parts of the dyestuff acid, obtained by coupling diazotized 4-chloro-2-amino-1-hydroxybenzene-6-sulfonic acid with 5:8-dichloro-1-hydroxynaphthalene, 700 parts by volume of dry chlorobenzene and 100 parts by volume of acetic anhydride is heated for 7 hours in an oil bath at 140–150° C., the mixture is then stirred until cold, the solid product is filtered off with suction, washed with benzene and dried in vacuo at 50–60° C.

The dyestuff pre-treated in this manner is pulverized, and covered with 200 parts by volume of dry chlorobenzene. After 200 parts by volume of liquid have been distilled from the mixture, 41 parts of phosphorus pentachloride are added at room temperature and the mixture is stirred for 16 hours at room temperature.

The unitary crystallizate consisting of large yellow prisms is then filtered off with suction, washed with petroleum ether and dried in vacuo. The product can be obtained in an analytically pure form by recrystallization from benzene. Analysis by combustion shows that it is the diacetylated sulfonic acid chloride of the parent dyestuff.

In a similar manner the dyestuffs produced by coupling the diazo components given in column I of the following table with the coupling components given in column II can be acetylated with acetic anhydride in the solvents or diluents given in column III, and then converted into the corresponding acetylated dyestuff sulfonic acid chlorides by means of phosphorus pentachloride in the solvents or diluents given in column V. In column IV are given the times and temperatures of the acetylations, and in column VI the times and temperatures of the reaction with phosphorus pentachloride.

Column VII gives characteristic properties of the corresponding sulfonic acid chlorides.

manner, and then converted into the corresponding benzoylated dyestuffs sulfonic acid chlorides with phos-

| | I | II | III | IV | V | VI | VII |
|---|---|---|---|---|---|---|---|
| 1 | 4-Chloro-2-amino-1-hydroxybenzene. | 1-Hydroxynaphthalene-4-sulfonic acid. | a total of 150 parts of acetic anhydride. | 2½ hours at 140–150° C. | Chlorobenzene. | 4½ hours at 20° C. | orange crystalline powder. |
| 2 | ----do---- | 1-Hydroxynaphthalene-5-sulfonic acid. | a total of 200 parts of acetic anhydride. | ⅓ hour at 140–150° C. | ----do---- | 16 hours at 20° C. | yellow-brown crystalline powder. |
| 3 | 1-Amino-2-hydroxynaphthalene-4-sulfonic acid. | 1-Acetoacetylamino-2-chlorobenzene. | 200 parts of glacial acetic acid. | 2 hours at 130–150° C. | ----do---- | ----do---- | yellow crystalline powder. |
| 4 | ----do---- | 1-(2'-Chloro) phenyl-3-methyl-5-pyrazolone. | a total of 100 parts of acetic anhydride. | ⅓ hour at 160–170° C. | Dioxane. | ----do---- | yellow-orange crystalline powder. |

Analysis by combustion shows that probably the products Nos. 1 and 2 are diacylated and Nos. 3 and 4 monoacylated ortho:ortho'-dihydroxy-azodyestuffs.

*Example 3*

39.4 parts of the dyestuff acid, obtained by coupling phorus pentachloride in the solvents or diluents mentioned in column IV. In column III are given the times and temperatures of the benzoylations. Column V gives the times and temperatures in the reactions with phosphorus pentachloride, and column VI gives characteristic properties of the final products.

| | I | II | III | IV | V | VI |
|---|---|---|---|---|---|---|
| 1 | 4-Chloro-2-amino-1-hydroxybenzene. | 2-Hydroxynaphthalene-6-sulfonic acid. | 1 hour, 60–70° C. | Chlorobenzene. | 1 hour, 20° C. | pale orange powder. |
| 2 | 4-Nitro-2-amino-1-hydroxybenzene-6-sulfonic acid. | 2-Hydroxynaphthalene. | ----do---- | ----do---- | 18 hours, 20° C. | dark orange powder. |
| 3 | 4-Chloro-2-amino-1-hydroxybenzene. | 1-Hydroxynaphthalene-4-sulfonic acid. | 4 hours, 60–70° C. | Benzene. | 5 hours, 20° C. | yellow powder. |
| 4 | 2-Amino-1-hydroxybenzene-4-sulfonic acid. | 2-Hydroxynaphthalene. | 3 hours, 50–60° C. | Chlorobenzene. | 1 hour, 20° C. | pale orange powder. |
| 5 | 1-Amino-2-hydroxynaphthalene-4-sulfonic acid. | 1-Acetoacetylamino-2-chlorobenzene. | Add benzoyl chloride. | ----do---- | 2 hours, 20° C. | yellow crystalline powder. |
| 6 | 1-Amino-2-hydroxy-6-nitronaphthalene-4-sulfonic acid. | 2-Hydroxynaphthalene. | 2 hours, 40–50° C. | ----do---- | 16 hours, 20° C. | ochre yellow powder. | diazotized 1-amino-2-hydroxynaphthalene-4-sulfonic acid with 2-hydroxynaphthalene, are introduced in a well dried condition into 200 parts by volume of dry pyridine. 35 parts by volume of benzoyl chloride are introduced dropwise in the course of 20 minutes, the mixture is heated for 2 hours at 40–50° C. and then allowed to cool. The mixture is then filtered with suction and the residual solid product consisting of small pale yellow needles is washed with dilute hydrochloric acid. The pale straw yellow product is dried in vacuo at 70–80° C.

31 parts of the dyestuff pre-treated in this manner in 130 parts by volume of chlorobenzene are mixed in the course of ½ hour in portions with 22 parts of phosphorus pentachloride. After stirring the mixture for 3 to 4 hours at room temperature, it is filtered and the uniform residue consisting of small slightly curved pale yellow needles is washed with petroleum ether and dried. The so-obtained diacylated sulfonic acid chloride which corresponds to the formula

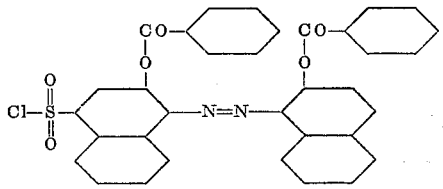

can be freed from adherent impurities of acid reaction by treatment with water.

Instead of 35 parts by volume of benzoylchloride there may be used with the same good result 52.5 parts of para-chlorobenzoyl chloride.

Instead of chlorobenzene there may be used as diluent or solvent toluene, benzene, or xylene.

The dyestuffs prepared by coupling the diazo components given in column I of the following table with the coupling components given in column II can be benzoylated with benzoyl chloride in pyridine in a similar manner, and then converted into the corresponding benzoylated dyestuffs sulfonic acid chlorides with phosphorus pentachloride in the solvents or diluents mentioned in column IV. In column III are given the times and temperatures of the benzoylations. Column V gives the times and temperatures in the reactions with phosphorus pentachloride, and column VI gives characteristic properties of the final products.

The benzoylated products Nos. 3 and 4 must be isolated by pouring the pyridine solution on to a mixture of ice and hydrochloric acid. Analysis by combustion shows that probably Nos. 2, 3, 4 and 6 contain two benzoyl groups and No. 5 contains one benzoyl group.

Product No. 1 corresponds to the formula

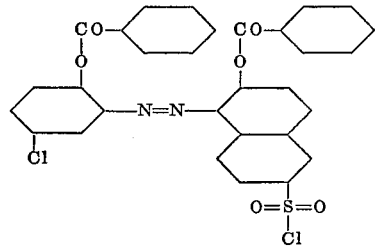

*Example 4*

27.9 parts of the dyestuff sulfonic acid chloride described in Example 3 are introduced into 100 parts by volume of chlorobenzene at 80–90° C. A stream of dry ammonia gas is passed over the mixture for 3 hours. After cooling the mixture, the solid material is filtered off with suction and dried. It is first washed with hot water, and, in order to complete the splitting off of the benzoyl groups, it is dissolved in hot alcohol with the addition of a sodium hydroxide solution, of 35 percent strength and reprecipitated from the solution by the addition of hydrochloric acid of 30 percent strength and, finally washed with a hot very dilute solution of hydrochloric acid. The dyestuff sulfonamide obtained in this manner is a claret colored powder.

The acylated dyestuff sulfonic acid chlorides given in column I of the following table can be converted in a similar manner into the corresponding dyestuff sulfonic acid amides in the solvents or suspension media given in column II by means of the amidating agents given in column III. Column IV gives characteristic properties of the final products.

| | I | II | III | IV |
|---|---|---|---|---|
| 1 | Chloride of No. 1 in the Table in Example 1. | Benzene | gaseous ammonia | Brownish powder. |
| 2 | Chloride of No. 3 in the Table in Example 1. | do | do | Claret colored powder. |
| 3 | Chloride of No. 4 in the Table in Example 1. | do | do | Red-brown powder. |
| 4 | Chloride of Example 1 | ethanol | aqueous ammonia of 25% strength. | Claret colored powder. |
| 5 | Chloride of No. 8 in the Table in Example 1. | Benzene | gaseous ammonia | Red-orange powder. |

Example 5

14.5 parts of the dyestuff sulfonic acid chloride No. 8 in the table in Example 1 are mixed in 100 parts by volume of alcohol with 6.1 parts by volume of morpholine, and the mixture is heated in a water bath for one hour at 80–90° C. After cooling the mixture, it is filtered with suction, the filter residue is washed with hot water, and for the purpose of further purification the product is dissolved in hot alcohol by the addition of a concentrated aqueous solution of sodium hydroxide, and reprecipitated with concentrated aqueous hydrochloric acid, then filtered off with suction and washed free from acid with hot water. When dried the sulfonic acid morpholine is a bright scarlet powder and can be obtained in analytically pure form by recrystallization from chlorobenzene. It melts at 246–247° C. with decomposition.

In a corresponding manner the acylated dyestuff sulfonic acid chlorides given in column I of the following table can be reacted in the solvents or suspension media given in column II with the compounds given in column III. Column IV gives the conditions of time and temperature used in carrying out these reactions. Column V gives characteristic properties of the final products.

pyrazolone radicals bound in the 4-position to an azo linkage, the β-keto carboxylic acid arylamide radicals bound to the azo linkage in α-position, and the 2-hydroxynaphthalene radicals bound in 1-position to the azo linkage, $n$ represents a whole number from 1 to 3, each —O— stands in adjacent position to the azo group, and at least one of the radicals $R_1$ and $R_2$ contains a sulfonic acid chloride group as a substituent, acyl being the acyl radical of a monocarboxylic acid.

2. An azo dyestuff derivative of the formula $$\left[\begin{array}{cc} O- & O- \\ | & | \\ R_1-N=N-R_2 \end{array}\right]-H_{n-1}(-CO-CH_3)_{3-n}$$

in which $R_1$ represents an aromatic radical containing at the most two and only carbocyclic six-membered rings, $R_2$—O— represents a radical selected from the group consisting of the 1-phenyl-3-methyl-5-pyrazolone radicals bound in the 4-position to an azo linkage, the β-keto carboxylic acid arylamide radicals bound to the azo linkage in α-position, and the 2-hydroxynaphthalene radicals bound in 1-position to the azo linkage, $n$ represents a whole number from 1 to 3, each —O— stands in adjacent position to the azo group, and at least one of the radicals

| | I | II | III | IV | V |
|---|---|---|---|---|---|
| 1 | Chloride of No. 4 of the Table in Example 1. | Ethanol | Morpholine | 1 hour at 80–90° C | brown-red powder, melting above 250° C. with decomposition. |
| 2 | Chloride of Example 1 | do | do | do | brick red powder. |
| 3 | do | Benzene | Monomethylaniline pyridine. | 4½ hours at 80–90° C | claret colored powder. |
| 4 | Chloride of No. 8 of the Table in Example 1. | | Dimethylamine of 20% strength. | 1 hour at 80–90° C | red powder. |
| 5 | do | Ethanol | Isopropylamine of 50% strength. | 2 hours at 80–90° C | Do. |
| 6 | do | Benzene | Aniline | 1 hour at 80–90° C | red crystalline powder. |
| 7 | do | do | 1-Amino-4-methoxybenzene. | 5 hours at 80–90° C | brown-red powder. |
| 8 | Chloride of No. 5 of the Table in Example 1. | Water | Morpholine | ⅓ hour at 100–110° C | yellow powder. |
| 9 | Chloride in No. 1 of the Table in Example 3. | Ethanol | Methylamine of 30% strength. | ⅔ hour at 80–90° C | red powder. |
| 10 | Chloride of No. 2 of the Table in Example 3. | | Dimethylamine of 33% strength. | 4 hours at 50–60° C., then 3 hours at 80–90° C. | brown-orange powder. |
| 11 | Chloride of No. 3 of the Table in Example 3. | Benzene | 1-Amino-2-methoxybenzene. | 6 hours at 80–90° C | claret colored crystalline powder with a bronze lustre. |
| 12 | Chloride of No. 1 of the Table in Example 2. | | Methylamine of 30% strength. | 2 hours at 80–90° C | dark red powder. |
| 13 | Chloride of No. 2 of the Table in Example 2. | Benzene | Morpholine | ½ hour at 80–90° C | claret colored powder. |
| 14 | Chloride of No. 4 of the Table in Example 3. | do | Aniline | 6 hours at 80–90° C | yellow-red powder. |
| 15 | Chloride of No. 3 of the Table in Example 2. | do | Morpholine | 1½ hours at 80–90° C | yellow powder. |
| 16 | Chloride of No. 9 of the Table in Example 1. | do | 1-Amino-4-ethoxybenzene. | 5 hours at 80–90° C | dark red powder. |
| 17 | Chloride of No. 4 of the Table in Example 2. | do | Aniline | 6 hours at 80–90° C | blue-red powder. |
| 18 | Chloride of Example 3 | | Dimethylamine of 30% strength. | 3 hours at 20° C, then ½ hour at 80–90° C. | claret colored powder. |
| 19 | Chloride of No. 6 of the Table in Example 3. | Benzene | Methylamine of 30% strength. | 2 hours at 70–80° C | dark green crystalline powder with bronze lustre. |
| 20 | do | | Dimethylamine of 30% strength. | 1 hour at 80–90° C | black crystalline powder with bronze lustre. |

What is claimed is:

1. An azo dyestuff derivative of the formula $$\left[\begin{array}{cc} O- & O- \\ | & | \\ R_1-N=N-R_2 \end{array}\right]-H_{n-1}-acyl_{3-n}$$

in which $R_1$—O— represents the radical of a diazo component containing only and at most two carbocyclic six-membered rings, $R_2$—O— represents a radical selected from the group consisting of the 1-phenyl-3-methyl-5-

$R_1$ and $R_2$ contains a sulfonic acid chloride group as a substituent.

3. An azo dyestuff derivative of the formula $$\left[\begin{array}{cc} O- & O- \\ | & | \\ R_1-N=N-R_2 \end{array}\right]-H_{n-1}(-CO-R_3)_{3-n}$$

in which $R_1$ represents an aromatic radical containing at the most two and only carbocyclic six-membered rings, $R_2O$— represents a radical selected from the group consisting of the 1-phenyl-3-methyl-5-pyrazolone radicals bound in the 4-position to an azo linkage, the β-keto carboxylic acid arylamide radicals bound to the azo linkage in α-position, and the 2-hydroxynaphthalene radical bound in 1-position to the azo linkage, $R_3$ represents an aromatic radical of the benzene series, $n$ represents a whole number from 1 to 3, each —O— stands in adjacent position to the azo group, and at least one of the radicals $R_1$ and $R_2$ contains a sulfonic acid chloride group as a substituent.

4. An azo dyestuff derivative of the formula

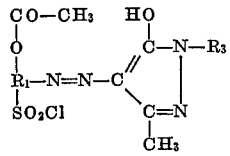

in which $R_1$ represents an aromatic radical containing at the most two and only carbocyclic six-membered rings, $R_3$ represents an aromatic radical of the benzene series and the $H_3C$—CO—O— group stands in ortho-position to the azo group.

5. An azo dyestuff derivative of the formula

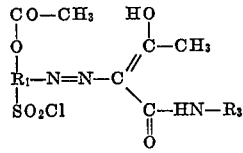

in which $R_1$ represents an aromatic radical containing at the most two and only carbocyclic six-membered rings, $R_3$ represents an aromatic radical of the benzene series and the $H_3C$—CO—O— groups stands in ortho-position to the azo group.

6. An azo dyestuff derivative of the formula

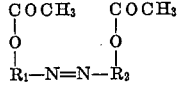

in which $R_1$ represents an aromatic radical containing at the most two and only carbocyclic six-membered rings, $R_2$ represents a naphthalene radical, the $H_3C$—CO—O— groups stand in ortho-position to the azo group and at least one of the radicals $R_1$ and $R_2$ contains a sulfonic acid chloride group.

7. An azo dyestuff derivative of the formula

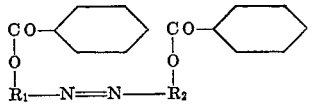

in which $R_1$ represents an aromatic radical containing at the most two and only carbocyclic six-membered rings, $R_2$ represents a naphthalene radical, the

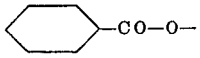

groups stand in ortho-position to the azo group and at least one of the radicals $R_1$ and $R_2$ contains a sulfonic acid chloride group.

8. The azo dyestuff derivative of the formula

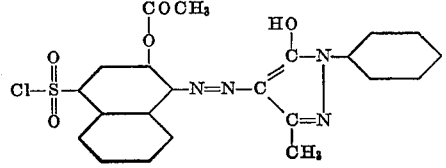

9. The azo dyestuff derivative of the formula

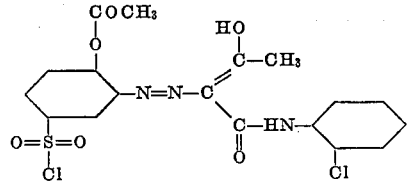

10. The azo dyestuff derivative of the formula

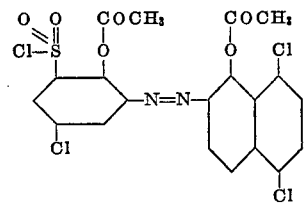

11. The azo dyestuff derivative of the formula

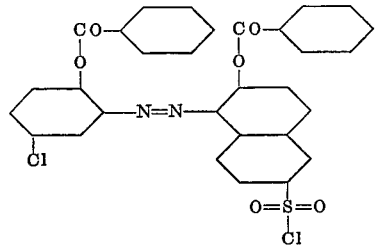

12. The azo dyestuff derivative of the formula

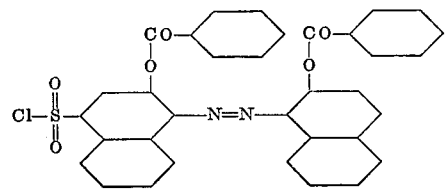

13. Process for the manufacture of functional derivatives of azo dyestuffs which comprises reacting in an inert diluent an azo dyestuff derivative of the formula

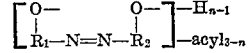

in which $R_1$—O— represents the radical of a diazo component containing only and at most two carbocyclic six-membered rings, $R_2$—O— represents a radical selected from the group consisting of the 1-phenyl-3-methyl-5-pyrazolone radicals bound in the 4-position to an azo linkage, the β-keto carboxylic acid arylamide radicals bound to the azo linkage in α-position, and the 2-hydroxynaphthalene radicals bound in 1-position to the azo linkage, $n$ represents a whole number from 1 to 3, each —O— stands in adjacent position to the azo group, at least one of the radicals $R_1$ and $R_2$ contains a sulfonic acid group as a substituent, and acyl is the acyl radical of a monocarboxylic acid, with a compound of pentavalent phosphorus containing at least 3 chlorine atoms.

14. Process for the manufacture of functional derivatives of azo dyestuffs which comprises reacting in an inert diluent an azo dyestuff derivative of the formula

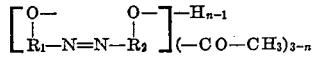

in which $R_1$ represents an aromatic radical containing only and at most two carbocyclic six-membered rings, $R_2$—O— represents a radical selected from the group consisting of the 1-phenyl-3-methyl-5-pyrazolone radicals bound in the 4-position to an azo linkage, the β-keto carboxylic acid arylamide radicals bound to the azo linkage in α-position, and the 2-hydroxynaphthalene radicals bound in 1-position to the azo linkage, $n$ represents a whole number from 1 to 3, each —O— stands in adjacent position to the azo group, and at least one of the radicals $R_1$ and $R_2$ contains a sulfonic acid group, with phosphorus pentachloride.

References Cited in the file of this patent

UNITED STATES PATENTS

| | | |
|---|---|---|
| 2,276,187 | Graenacher et al. | Mar. 10, 1942 |
| 2,373,407 | McNally et al. | Apr. 10, 1945 |
| 2,428,866 | Conzetti et al. | Oct. 14, 1947 |
| 2,443,314 | Haddock | June 15, 1948 |
| 2,606,185 | Widmer | Aug. 5, 1952 |